March 10, 1953  F. R. McFARLAND  2,630,895
CLUTCH CONTROL FOR ENGINE BRAKING
Filed Aug. 11, 1950
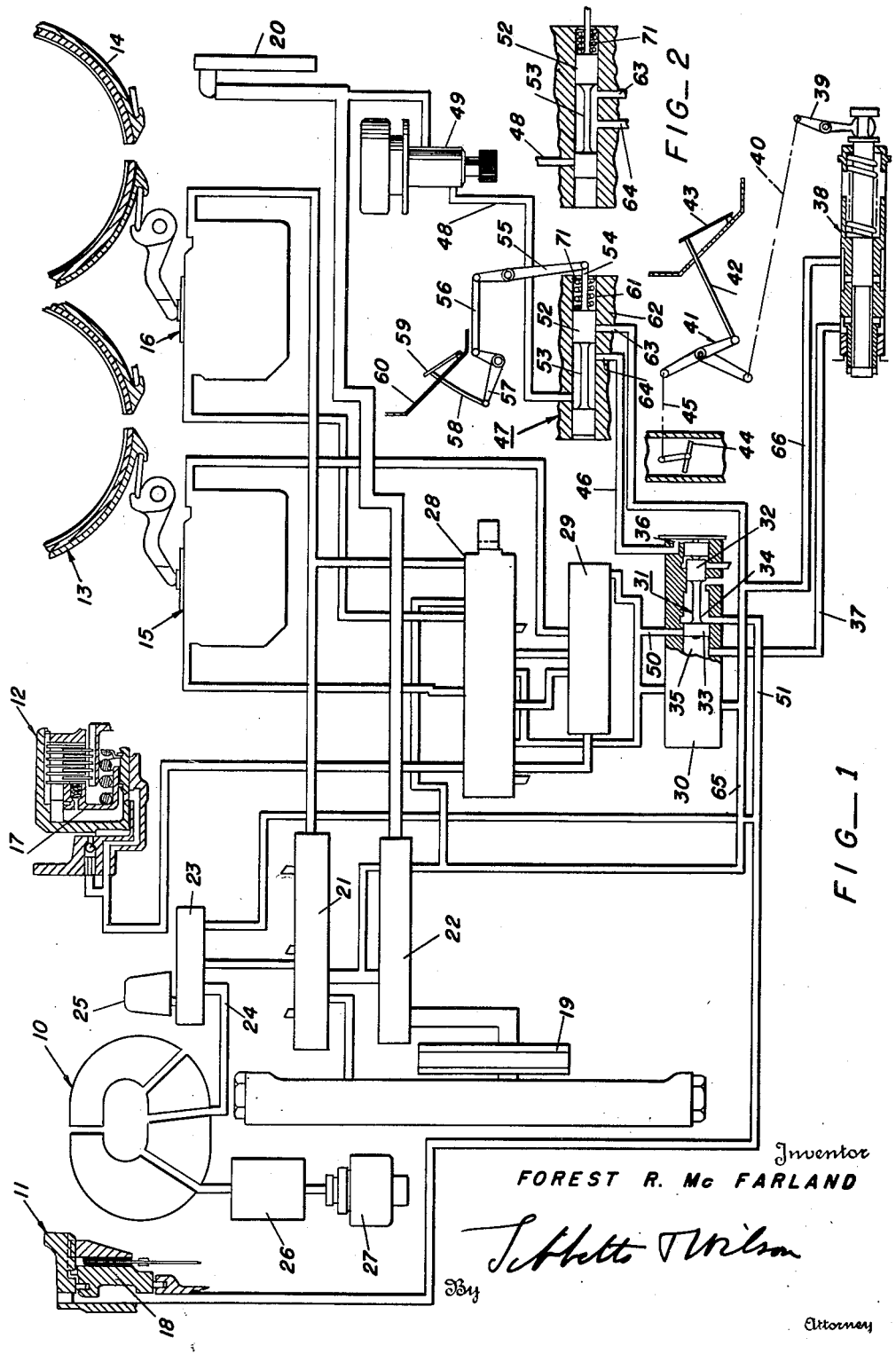
Inventor
FOREST R. McFARLAND
By
Attorney Patented Mar. 10, 1953

2,630,895

UNITED STATES PATENT OFFICE 2,630,895

CLUTCH CONTROL FOR ENGINE BRAKING

Forest R. McFarland, Huntington Woods, Mich., assignor to Packard Motor Car Company, Detroit, Mich., a corporation of Michigan Application August 11, 1950, Serial No. 178,976

3 Claims. (Cl. 192—.096)

This invention relates to a control means for an automatic automobile transmission and is a modification of the control means shown in my co-pending application, Serial No. 71,128, filed January 15, 1949.

In the aforesaid co-pending application, there is disclosed a transmission for passenger cars or the like, said transmission including an hydraulic torque converter driven directly from the engine; a two speed, neutral and reverse complex planetary type transmission; a friction clutch for bypassing the torque converter, a brake for securing reverse drive through the transmission, a brake for securing a reduced speed and multiplied torque drive through the transmission, and a multiple plate friction clutch for securing a direct drive through said transmission. These clutches and brakes are operated by hydraulic means which includes a pair of pumps, one driven continuously by the engine and the other driven by the output shaft of the transmission; a governor for controlling the operation of the direct drive clutch for by-passing the torque converter, and various valves for effecting a smooth and positive operation on the various clutches and brakes under all conditions of operation of the vehicle.

The time of shift from the converter drive to direct drive through the direct drive friction clutch is controlled jointly by the governor and the accelerator pedal, but is normally so designed as to release the said direct drive clutch at speeds below 15 miles per hour. It is desirable under certain conditions, such as when the vehicle is coasting downhill, to have the direct drive clutch engaged at speeds below 15 miles per hour to secure the advantage of the braking action afforded by the engine. This operation, however, is not possible with the aforesaid transmission.

The principal object of this invention is to provide a manually controlled means for operating the direct drive clutch of an automatic transmission such as the one described above which utilizes a continuously driven hydraulic torque converter for the normal transmission of power from the engine and which is dependent upon the attainment of a predetermined vehicle speed for the automatic operation of the direct drive clutch, so that the braking effect normally available in the engine can be utilized with the hydraulic torque converter type of transmission at low vehicle speeds.

A more specific object of this invention is to provide a foot pedal operated valve in the aforesaid transmission control system which performs the function of the governor operated valve to supply fluid under pressure to the control system for effecting and maintaining a shift into direct drive around the converter.

A feature of this invention is the provision of a manually controlled valve for controlling the operation of a direct drive friction clutch, which may be utilized to effect the starting of the engine by pushing the vehicle in which the transmission is installed.

These and other objects and features of this invention will become apparent from the following detailed description when taken together with the accompanying drawings in which Fig. 1 is a schematic diagram of the hydraulic system of a transmission, such as the one described above, said system incorporating the manually controlled valve of this invention and Fig. 2 is a fragmentary view of the valve of this invention shown in its operative position.

Referring now to the drawings for a detailed description of this invention, there is shown an hydraulic torque converter 10, a direct drive friction clutch 11, which is connected in the power line from the engine (not shown) in parallel with the torque converter 10, a multiple plate friction clutch 12 which is used in connection with gearing (not shown) for effecting a direct drive through the gearing, a brake 13 which provides a reduced drive through the gearing and a brake 14 which provides a reverse drive through said gearing. Brakes 13 and 14 are operated by hydraulic servomotors 15 and 16, respectively, clutch 12 is operated by an annular piston 17, and direct drive clutch 11 is operated by an annular piston 18.

The fluid for operating the brakes and clutches as well as converter 10 is supplied by a front pump 19 which is driven directly from the engine, and hence is operable whenever the engine is rotating, and by a rear pump 20 which is operable only when the vehicle is in motion. A pump selector valve 21 determines which pump shall be effective to supply fluid under pressure to the system and also regulates the maximum pressure output of each pump. Under normal conditions the front pump is operable only when the vehicle is standing still or is getting under way, while the rear pump is operable at cruising speeds and in general at all other times.

The fluid from both pumps passes to a pump check valve 22 which prevents the escape of fluid through the pump not then in use. From check valve 22 the fluid passes to pump selector valve 21 which in turn directs fluid under pressure to the converter inlet valve 23 from which the fluid passes through a conduit 24 to converter 10. A converter relief valve 25 regulates the pressure of the fluid within the converter when the direct drive clutch is engaged and during the time when it is being engaged. The fluid circulates through converter 10 and passes through a cooler 26 from which it then passes through a converter outlet valve 27 to the sump.

A manually controlled valve 28 is provided for selecting reverse, neutral, low range and high range operation of the transmission. Valve 28, therefore, controls clutch 12 as well as pistons 15 and 16. The means for operating control valve 28 comprises a lever at the steering wheel of the vehicle, the lever being operated by the driver to select the operations enumerated above. In order to prevent a lag or lurch when shifting manually from low range to high range or vice versa, at any throttle opening, that is, when shifting from brake 13 to clutch 12, a timing valve 29 is provided. Said timing valve synchronizes the engagement and disengagement of high range clutch 12 and low range brake 13. A pressure modulating valve 30 (not shown in detail) is provided to furnish a variable modulated pressure in accordance with engine load and throttle opening to the high range clutch 12 when shifting from low range to high range. Thus the higher the speed or load, the higher the pressure furnished by valve 30.

The shift from converter drive to direct drive, that is, from drive through converter 10 to drive through clutch 11 is controlled by valve 31 which may be located in the same valve block as valve 30. Valve 31 is comprised of a pair of pistons 32, 33 and a peripheral groove 34. Piston 33 is influenced by the fluid under pressure in a chamber 35 and piston 32 is influenced by the pressure of fluid in a chamber 36. Chamber 35 communicates through conduit 37 with a throttle valve 38, the purpose of which is to obtain a regulated oil pressure in direct proportion to the throttle opening. To achieve this function, throttle valve 38 is connected by suitable links 39 and 40, lever 41 and link 42 to the accelerator pedal 43. The throttle 44 is connected through link 45 to lever 41, so that valve 38 will be operated simultaneously with engine throttle 44 from accelerator pedal 43 and will move directly with the engine throttle 44. The design of the valve 38 is such that the pressure developed in conduit 37 by valve 38 increases as engine throttle 44 is opened. The fluid modulated by throttle valve 38 is derived from either pump 19 or pump 20 through pump selector valve 21, pump check valve 22, conduit 65 and a conduit 66. It should be noted here that the pressure of the fluid in conduit 65 and 66 is the maximum available in the system.

The pressure in chamber 36 is derived through a conduit 46 and the novel manually controlled valve 47, hereinafter to be described in detail, and conduit 48 from the governor controlled valve 49. The said governor controlled valve 49 is a centrifugal hydraulic device which produces a variable fluid pressure from the rear pump 20 to the direct drive clutch shift valve 31 calibrated according to car speed.

Thus it is apparent that direct drive clutch shift valve 31 will move to the right, as viewed in Fig. 1, if the pressure in chamber 35 exceeds the pressure in chamber 36, and will move to the left as viewed in Fig. 1, if the pressure in chamber 36 exceeds that in chamber 35. Since the pressure generated by governor valve 49 increases as a function of the car speed and the pressure developed by throttle valve 38 increases as a function of the throttle opening, the shift into direct drive will be delayed, that is, it will occur at a higher speed, as the accelerator pedal is depressed to open the throttle 44. Similarly, with a light throttle setting and low speed, valve 31 will shift to the right as viewed in Fig. 1 and will prevent the operation of clutch 18.

The fluid for operating clutch 18 is obtained from timing valve 29 through conduit 50. This conduit is normally blocked by piston 33, but when valve 31 is shifted to the left, as viewed in Fig. 1, by the increased pressure derived from governor valve 49, conduit 51 then is aligned with peripheral groove 34, so that the fluid under pressure passes around valve 31 and into a conduit 51 which is directly connected with the piston 18 of direct drive clutch 11.

The details of the manually operated valve 47 for maintaining the operation of clutch 11 will now be described.

Valve 47 is comprised of a balanced piston valve 52, having a peripheral groove 53 and an operating rod 54 connected through a lever 55, a connecting link 56, a bell crank 57 and a link 58 to a second pedal 59 pivotally mounted on the toe board 60 of the vehicle. A spring 71 is provided to yieldingly urge the valve 52 toward an inoperative position. Piston valve 52 operates in a bore 61 in a valve block 62, said valve block having conduits 63 and 64 therein. Conduit 63 is connected through conduit 65 to pump check valve 22 which is normally open to rear pump 20 to connect pump 20 to conduit 65. Conduit 64 is connected to conduit 46 which in turn conducts fluid to chamber 36.

When valve 52 is in the position shown in Fig. 1, conduit 63 is blocked off by the valve 52 and conduit 64 is connected through peripheral groove 53 to conduit 48 which in turn is connected to the governor valve 49, supplying regulated pressure from pump 20. This is the normal operation of the transmission and allows valve 31 to be controlled automatically by the joint action of governor valve 49 and throttle valve 38.

When it is desired to operate clutch 11 manually, that is, to override the action of governor valve 49 as well as the action of throttle valve 38, pedal 59 is depressed, thereby shifting valve 52 through link 58, bell crank 57, link 56, lever 55 and operating rod 54 to the position shown in Fig. 2. In that position conduit 48 is blocked by valve 52 and conduit 63 is connected through the peripheral groove 53 to conduit 64, thereby connecting the output of pump 20 directly to conduit 64, conduit 46 and chamber 36. It will be noted that chamber 35 at the opposite side of valve 31 is always filled with fluid at a pressure determined by the position of throttle valve 38 which is always less than pump pressure, whereas chamber 36 under the conditions illustrated in Fig. 2 is filled with fluid at pump pressure which is the highest available pressure in the system and is higher than the pressure in chamber 35. The modulated throttle pressure may vary from 26 to 58 pounds per square inch, whereas the pump pressure varies from 80 to 90 pounds per square inch. This means that valve 31 will always be shifted to the left, as viewed in Figs. 1 and 2, when valve 52 is shifted to the position shown in Fig. 2. This means, in turn, that fluid under pressure will be directed through valve 31 to clutch 11 to operate said clutch, and the clutch will remain operated as long as pedal 59 is depressed.

Pedal 59 may be depressed at any time, whether the vehicle is standing still or is in motion. Thus it may be used to connect the engine to the rear wheels when the vehicle is coasting downhill, so as to take advantage of the braking action afforded by the engine. This operation is normally desirable below 15 miles per hour, since above that speed the clutch would normally be engaged in any event and the braking action would thus be available. It is also possible to operate clutch 11 manually by depressing pedal 59 when it is desired to start the engine by pushing the vehicle. Under these conditions, neither pump 20 nor pump 21 is operating and, hence, no pressure is available until the vehicle is in motion. Just as soon as the vehicle speed becomes high enough to provide clutch operating pressure, such pressure will be available through the operation of valve 31. For a push start, it is desirable, of course, not to depress pedal 59 until the vehicle is moving sufficiently fast to assure fluid in the system at clutch operating pressure.

Although the manually operated valve of this invention has been described with reference to its application to a control system, such as the one disclosed in my co-pending application S. N. 71,128, filed January 15, 1949, it is understood that the scope of this invention is not limited to such application, but is to be determined by the appended claims.

What is claimed is:

1. In combination with an engine, a power transmitting device, means for connecting the engine to the power transmitting device, a clutch for connecting the engine to the power transmitting device in parallel with the said means, fluid pressure means for operating the clutch, a source of fluid under pressure, a differential pressure operated valve for connecting the source of pressure to the clutch operating means, a speed responsive valve adapted to regulate the pressure of fluid passing therethrough as a function of speed, means for connecting the speed responsive valve to the source of fluid under pressure and to the differential pressure operated valve, said last mentioned means including a third valve adapted in one position to connect the speed responsive valve to the differential pressure operated valve and in another position to connect the source of fluid under pressure to the pressure differential valve while rendering the speed responsive valve ineffective, said third valve in said other position causing the pressure differential operated valve to connect the source of fluid under pressure to the fluid pressure means for operating the clutch.

2. In combination with an engine having a throttle, a power transmitting device, means for connecting the engine to the power transmitting device, a clutch for connecting the engine to the power transmitting device in parallel with the said means, fluid pressure means for operating the clutch, a source of fluid under pressure, a differential pressure operated valve for connecting the source of pressure to the clutch operating means, an accelerator pedal operated pressure regulating valve for connecting the source of pressure to one side of the differential pressure operated valve, said accelerator pedal operated valve producing a pressure which increases with the throttle opening but does not equal the pressure of the said source, and manually operable valve means for connecting fluid directly from said source to the other side of the differential pressure operated valve, such that said differential pressure operated valve can always be controlled by the said manually operable valve.

3. A combination as described in claim 2, and a speed responsive pressure regulating valve connected to said source of fluid under pressure and to said pressure differential valve, said speed responsive valve being driven by said power transmitting device and adapted to produce a pressure which varies as a function of speed, said manually operable valve being interposed between the speed responsive valve and the differential pressure operated valve to control the application of fluid under pressure from said speed responsive valve to the differential pressure operated valve.

FOREST R. McFARLAND.

REFERENCES CITED

The following references are of record in the file of this patent:

UNITED STATES PATENTS

| Number | Name | Date |
| --- | --- | --- |
| Re. 22,967 | Nutt | Jan. 27, 1948 |
| 2,349,937 | Buchhart | May 30, 1944 |
| 2,495,515 | Foley | Jan. 24, 1950 |

OTHER REFERENCES

Packard Serviceman's Training Book on Ultramatic Drive, published, May 1949.